(12) United States Patent
Iwata et al.

(10) Patent No.: US 12,202,716 B2
(45) Date of Patent: Jan. 21, 2025

(54) TRANSFER DEVICE

(71) Applicant: Daifuku Co., Ltd., Osaka (JP)

(72) Inventors: Masashige Iwata, Hinocho (JP);
Kazunari Kimura, Hinocho (JP);
Hiroyoshi Murata, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 244 days.

(21) Appl. No.: 17/742,487

(22) Filed: May 12, 2022

(65) Prior Publication Data

US 2022/0363527 A1 Nov. 17, 2022

(30) Foreign Application Priority Data

May 13, 2021 (JP) ................................. 2021-081804

(51) Int. Cl.
*B65G 1/04* (2006.01)
*B66F 9/10* (2006.01)
(52) U.S. Cl.
CPC .............. *B66F 9/10* (2013.01); *B65G 1/0407* (2013.01)
(58) Field of Classification Search
CPC .................................................... B65G 1/0435
See application file for complete search history.

(56) References Cited

U.S. PATENT DOCUMENTS

| 5,927,926 | A | * | 7/1999 | Yagi | ..................... B65G 1/0407 |
| | | | | | 414/280 |
| 9,522,781 | B2 | * | 12/2016 | Hortig | .................... B65G 1/065 |
| 9,718,617 | B2 | * | 8/2017 | Koide | ................... B65G 1/0435 |
| 10,800,617 | B2 | * | 10/2020 | Ueda | ..................... B65G 61/00 |
| 11,827,451 | B2 | * | 11/2023 | Iwata | ................... B65G 1/0492 |
| 2015/0081089 | A1 | * | 3/2015 | Kapust | ................. B65G 1/1373 |
| | | | | | 700/218 |

FOREIGN PATENT DOCUMENTS

| JP | 226010 U | 2/1990 |
| JP | 2000118620 A | 4/2000 |

* cited by examiner

*Primary Examiner* — Mark C Hageman
(74) *Attorney, Agent, or Firm* — The Webb Law Firm

(57) ABSTRACT

A transfer driver includes a transfer drive transmission mechanism drivingly coupled to a contact section, and a transfer drive source configured to drive the transfer drive transmission mechanism. A guide driver includes a guide drive transmission mechanism drivingly coupled to a pair of guide sections, and a guide drive source configured to drive the guide drive transmission mechanism. The transfer drive source and the guide drive source are disposed on a transfer-direction scooping side relative to a holder, and the transfer drive transmission mechanism and the guide drive transmission mechanism intersect each other in a vertical view at an intersection portion, and are adjacent to each other in a vertical direction at the intersection portion.

3 Claims, 9 Drawing Sheets

TRANSFER DEVICE

CROSS-REFERENCE TO RELATED APPLICATION

This application claims priority to Japanese Patent Application No. 2021-081804 filed May 13, 2021, the disclosure of which is hereby incorporated by reference in its entirety.

BACKGROUND OF THE INVENTION

1. Field of the Invention

The present invention relates to a transfer device that includes a holder configured to hold an article, and that performs a transfer operation including an unloading operation for transferring the article from the holder to a transfer target location, and a scooping operation for transferring the article from the transfer target location to the holder.

2. Description of the Related Art

An example of such a transfer device is disclosed in JP 2000-118620A (Patent Document 1). In the following, the reference numerals shown in parentheses in the description of the related art are those of Patent Document 1.

A transfer device (14) disclosed in Patent Document 1 includes a holder (21) for holding an article (W), and an extension/retraction member including a plurality of forks. The transfer device (14) is configured to transfer the article (W) between the holder (21) and a transfer target location such as a storage port (6), a retrieval port (7), and a storage section (3), using the extension/retraction member.

In the technique disclosed in Patent Document 1, there is still room for improvement regarding reduction in the vertical size of the transfer device (14) by, for example, adjusting the arrangement positions of various functional parts of the transfer device (14) that have different functions for transferring the article (W). For example, in the case of the transfer device (14) disclosed in Patent Document 1, a motor (M) for extending/retracting the extension/retraction member is provided at a position that overlaps the position of the holder (21) in a vertical view. Accordingly, due to this overlapping, the overall size of the transfer device (14) tends to increase in the vertical direction.

SUMMARY OF THE INVENTION

In view of the above-described circumstances, it is desirable to realize a transfer device whose vertical size can be reduced.

A transfer device that includes a holder configured to hold an article, and that is configured to perform a transfer operation including (i) an unloading operation for transferring the article from the holder to a transfer target location and (ii) a scooping operation for transferring the article from the transfer target location to the holder, the transfer device including:
 a transfer unit configured to move the article in a horizontal transfer direction between the holder and the transfer target location;
 a guide unit configured to guide, in the transfer direction, the article that is moved between the holder and the transfer target location; and
 a body configured to support the transfer unit and the guide unit,
wherein the transfer unit includes: a contact section configured to come into contact with the article to move the article in the transfer direction during the transfer operation; and a transfer driver configured to cause the contact section to reciprocate in the transfer direction,
the guide unit includes: a pair of guide sections disposed on opposite sides of the article held by the holder in a width direction that is orthogonal to the transfer direction in a vertical view taken in a vertical direction; and a guide driver configured to change an interval between the two guide sections in the width direction,
the transfer driver includes: a transfer drive transmission mechanism drivingly coupled to the contact section; and a transfer drive source configured to drive the transfer drive transmission mechanism,
the guide driver includes: a guide drive transmission mechanism drivingly coupled to the guide sections; and a guide drive source configured to drive the guide drive transmission mechanism,
the transfer drive source and the guide drive source are disposed on a scooping side in the transfer direction relative to the holder, the scooping side being from the transfer target location toward the holder in the transfer direction, and an unloading side in the transfer direction being from the holder toward the transfer target location in the transfer direction, and
the transfer drive transmission mechanism and the guide drive transmission mechanism intersect each other in the vertical view at an intersection portion, and are adjacent to each other in the vertical direction at the intersection portion.

With this configuration, the transfer drive source and the guide drive source are disposed on the scooping side in the transfer direction relative to the holder. Accordingly, the vertical size of the transfer device can be kept small as compared with a case where the transfer drive source and the guide drive source are disposed overlapping with the holder in a vertical view. In addition, as compared with a case where the transfer drive source and the guide drive source are disposed on the unloading side in the transfer direction relative to the holder, the presence of the drive sources is less likely to obstruct the transfer of the article. With this configuration, the movement direction of the contact section and the movement direction of the guide section intersect each other, and the contact section and the guide section are arranged based on the holder. Therefore, the transfer drive transmission mechanism and the guide drive transmission mechanism inevitably have an intersection portion where they intersect each other in a vertical view. However, the transfer drive transmission mechanism and the guide drive transmission mechanism are disposed adjacent to each other in the vertical direction at the intersection portion. Accordingly, the vertical size of the transfer device can be easily kept small even though the transfer drive transmission mechanism and the guide drive transmission mechanism have an intersection portion. As such, this configuration can reduce the vertical size of the transfer device.

Further features and advantages of the technique according to the present disclosure will become apparent from the following description of illustrative and non-limiting embodiments with reference to the drawings.

DETAILED DESCRIPTION OF PREFERRED EMBODIMENTS

A transfer device is a device that performs an operation for transferring articles. An embodiment the transfer device will be described below, taking, as an example, a case where the transfer device is configured as a part of a transport vehicle provided in a transport facility for transporting containers. That is, in the present embodiment, a container corresponds to an "article", and the transfer device is configured to transfer the container.

Figure 1:
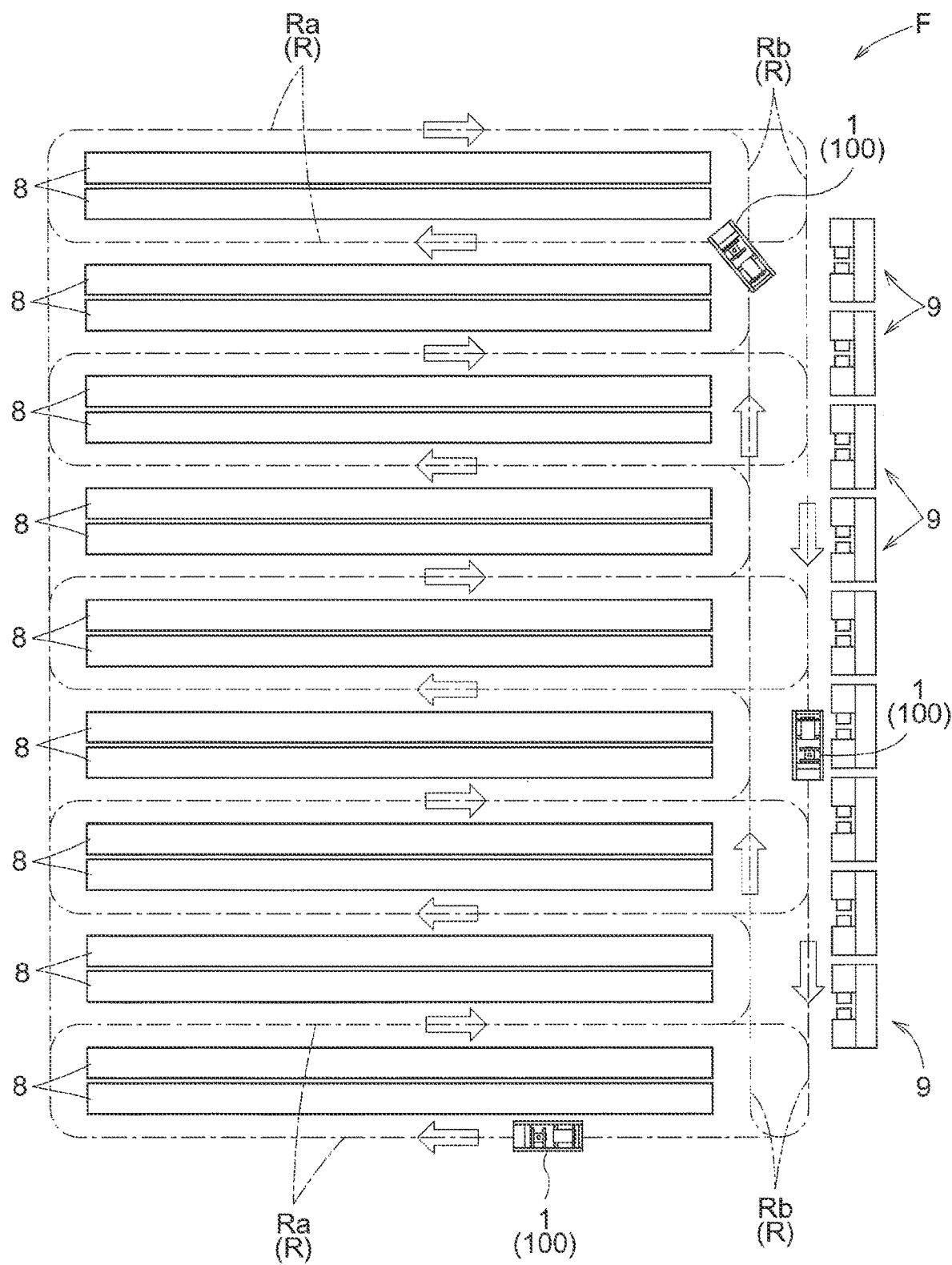
FIG. 1 is a plan view of a transport facility.

As shown in FIG. 1, a transport facility F includes a container rack 8 that stores a container 70 (see FIG. 2), and a carry-in/out section 9 where the container 70 is carried out of, or carried into the facility. The transport vehicle 100 transports the container 70 carried into the facility through the carry-in/out section 9 to the container rack 8, or transports the container 70 stored in the container rack 8 to the carry-in/out section 9 so as to be carried out of the facility.

In the present embodiment, a plurality of container racks 8 are disposed parallel to each other at predetermined intervals. Each of the plurality of container racks 8 is open at least on the front side thereof, and the container 70 is placed into or out of the container rack 8 on the front side. A portion of a travel path R of a travel body 1 (transport vehicle 100) is set between a pair of container racks 8 that are adjacent to each other with the front sides thereof facing each other. In other words, a pair of adjacent container racks 8 are disposed parallel to each other at an interval and a portion of the travel path R is set so as to pass between the two container racks 8. Of the plurality of container racks 8 provided in the transport facility F, container racks 8 that are located at farthest ends are each disposed with the front side facing outward, and a portion of the travel path R is also set in a region extending along the front side of each of the container racks 8 located at farthest ends. A plurality of carry-in/out sections 9 are provided in the transport facility F, and a portion of the travel path R is also set in regions respectively passing along the plurality of carry-in/out sections 9.

The travel path R includes an intra-rack path Ra that extends along the front side of each container rack 8 in the extension direction of the container rack 8, and an out-of-rack path Rb that is set outside an arrangement region of the container racks 8. The intra-rack paths Ra are set in one-to-one correspondence with the plurality of container racks 8. In the present embodiment, a portion of the travel path R set in a region between a pair of container racks 8 that are adjacent to each other with the front sides thereof facing each other, and a portion of the travel path R set in a region extending along the front side of each container rack 8 that is disposed with the front side facing outward correspond to the intra-rack paths Ra. The out-of-rack paths Rb are set so as to connect the plurality of intra-rack paths Ra to each other. The out-of-rack paths Rb are also set so as to pass along corresponding ones of the plurality of carry-in/out sections 9. In the present embodiment, portions of the travel path R other than the intra-rack paths Ra correspond to the out-of-rack paths Rb.

Container Rack

Figure 2:
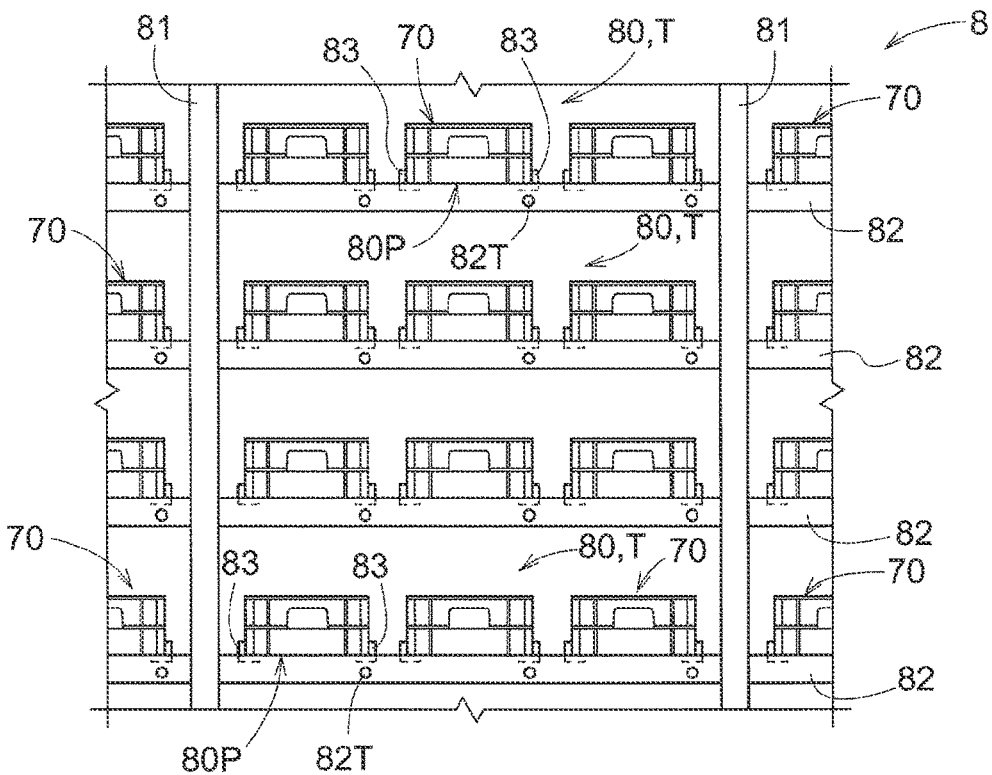
FIG. 2 is a front view of a container rack.

As shown in FIG. 2, each container rack 8 includes rack sections 80 that store containers 70, the rack sections 80 being arranged in a plurality of rows in the vertical direction. In the present embodiment, each container rack 8 includes a plurality of beam members 82 extending in a horizontal direction along the front side of the container rack 8, and also includes a plurality of strut members 81 extending in a vertical direction and coupled to corresponding ones of the plurality of beam members 82. That is, each container rack 8 includes a support frame formed by a combination of a plurality of strut members 81 and a plurality of beam members 82.

The plurality of beam members 82 are spaced apart from each other in the vertical direction. A placement member 83 for placing the container 70 thereon is coupled to each of the plurality of beam members 82. In the present example, each container 70 is stored in the rack section 80 by being placed on a pair of placement members 83. A plurality of sets of pairs of placement members 83 are disposed in each rack section 80, and thus a plurality of containers 70 can be stored in one rack section 80. In the present example, a region that is located between a pair of strut members 81 adjacent to each other in a width direction (lateral direction), and is located between a pair of beam members 82 adjacent to each other in the vertical direction in a front view shown in FIG. 2 corresponds to an opening of the container rack 8.

In the present embodiment, at a reference position 80P of each rack section 80 that serves as a reference for storing the container 70, a target portion 82T serving as a target for storing the container 70 at the reference position 80P is provided. In the present example, the target portion 82T is provided on each beam member 82. One target portion 82T is provided for each set of pairs of placement members 83. In the illustrated example, each target portion 82T is constituted by a hole formed in the corresponding beam member 82.

Container

A container 70 is an object to be transported by the transport vehicle 100. Although a detailed illustration has been omitted, each container 70 is formed in the shape of a box with an opening open upward. In the present example, each container has a rectangular outer shape in a vertical view. A predetermined content object can be accommodated inside each container 70. Examples of the content object include various commercial products such as food products and housewares, and components and workpieces that are used on product lines of factories.

In the present embodiment, each container 70 can be stacked on top of another container 70 while accommodating a content object therein. That is, the containers 70 are stackable in the vertical direction (see FIG. 3). In the present example, the bottom of each container 70 is fitted to the opening of another container 70 from above, whereby the two containers 70 are stacked in the vertical direction.

Transport Vehicle

Figure 3:
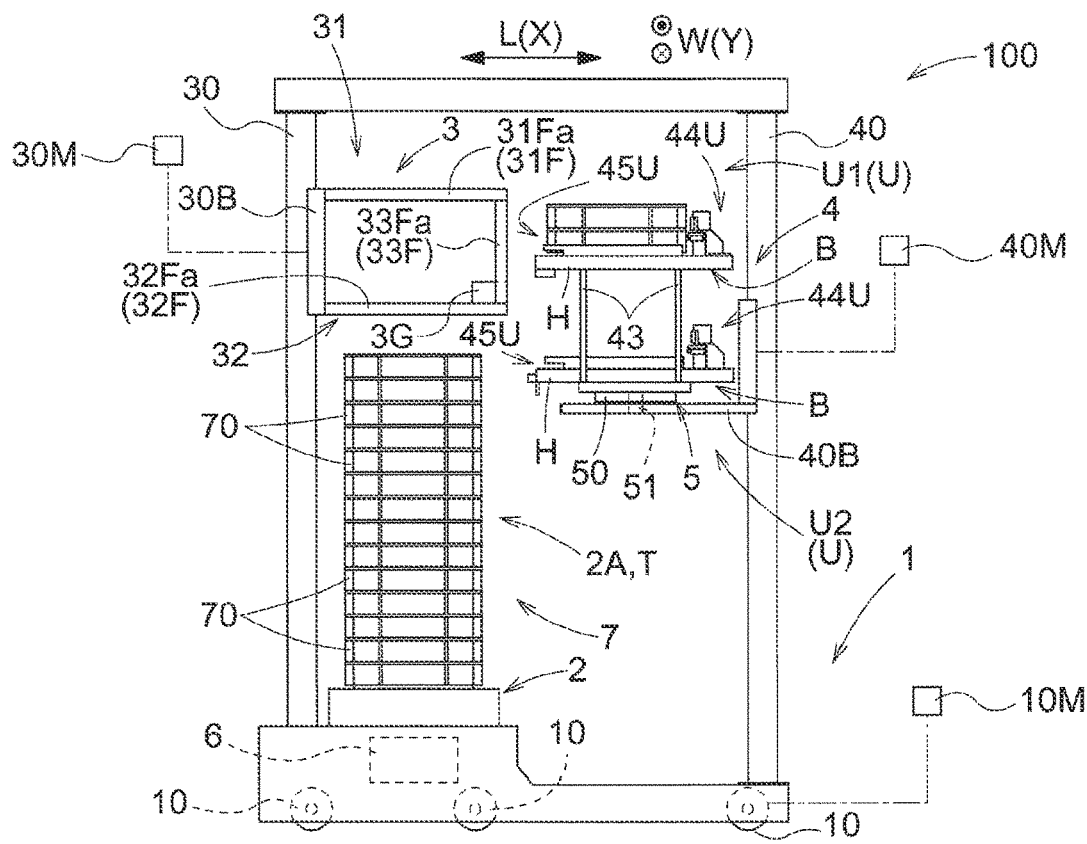
FIG. 3 is a diagram showing a transport vehicle as viewed in a vehicle width direction.

As shown in FIG. 3, the transport vehicle 100 includes a travel body 1 that travels along a predetermined travel path R (see FIG. 1), a transfer device 4 that transfers the containers 70, and a controller 6 that controls the transfer device 4. In the present embodiment, the transport vehicle 100 includes a container group supporter 2 that supports a plurality of containers 70 as a container group 7 in a stacked state inside a predetermined stacking region 2A, and a lifting device 3 that lifts the containers 70 of the container group 7 supported by the container group supporter 2. The controller 6 controls the travel body 1, the container group supporter 2, and the lifting device 3, in addition to the transfer device 4.

The container group supporter 2, the lifting device 3, and the transfer device 4 are mounted on the travel body 1. With a direction in which the travel body 1 travels being a "vehicle front-rear direction L", the container group supporter 2 and the transfer device 4 are arranged on the travel body 1 in the vehicle front-rear direction L. Hereinafter, a direction orthogonal to the vehicle front-rear direction L in a vertical view is referred to as a "vehicle width direction W".

The controller 6 controls various functional parts of the transport vehicle 100. In the present example, the controller 6 controls the travel body 1, the container group supporter 2, the lifting device 3, the transfer device 4, and a turning device 5, which will be described later. Operations for transporting and transferring the containers 70 are implemented by the controller 6 controlling the functional parts. The controller 6 includes, for example, a processor such as a microcomputer, and a peripheral circuit such as a memory. Various functions are implemented by these pieces of hardware working cooperatively with a program executed on a processor such as a computer.

Travel Body

The travel body 1 is configured to travel along the predetermined travel path R (see FIG. 1). In the present embodiment, the travel body 1 travels along the intra-rack path Ra and the out-of-rack path Rb. When traveling along the intra-rack path Ra, the travel body 1 travels along the container rack 8, and more specifically, the travel body 1 travels along the front side of the container rack 8. In the present embodiment, the travel body 1 travels on a floor.

The travel body 1 includes a plurality of travel wheels 10, and a travel driver 10M that drives at least one of the plurality of travel wheels 10. The travel driver 10M includes a motor (not shown). The travel body 1 is given propelling force in the traveling direction as a result of the travel driver 10M driving the travel wheel 10.

Container Group Supporter

As shown in FIG. 3, the container group supporter 2 is mounted on the travel body 1. The container group supporter 2 is configured to support a plurality of containers 70 as a container group 7 in a stacked state. A stacking region 2A in which the container group 7 is disposed is defined above the container group supporter 2. The stacking region 2A is a three-dimensional virtual region extending upward from the container group supporter 2. In the present example, the container group supporter 2 is configured as a conveyor capable of moving a container group 7 with the container group 7 placed thereon. In the present example, the container group supporter 2 is capable of moving the container group 7 in the vehicle width direction W. The conveyor constituting the container group supporter 2 may be any well-known conveyor such as a roller conveyor, a chain conveyor, or a belt conveyor.

The container group 7 in which a plurality of containers 70 are stacked is carried into the facility through each carry-in/out section 9 (see FIG. 1). With the travel body 1 being adjacent to the carry-in/out section 9, the container group supporter 2 receives the container group 7 from the carry-in/out section 9, or hands over the container group 7 to the carry-in/out section 9. That is, the container group supporter 2 is configured to receive and hand over the container group 7 from and to the carry-in/out section 9. Although a detailed illustration has been omitted, in the present example, each carry-in/out section 9 is located adjacent to a picking area where content objects such as commercial products are retrieved from each container 70. After the container group 7 has been handed over from the container group supporter 2 to the carry-in/out section 9, the content objects are taken out from the container 70 in a picking area located adjacent to the carry-in/out section 9. After part or all of the content objects accommodated in a container 70 have been taken out, the container 70 is handed over from the carry-in/out section 9 to the container group supporter 2 (transport vehicle 100), and is transported to the container rack 8 again. However, the carry-in/out section 9 need not be located adjacent to the picking area, and may be located adjacent to another facility or a working area. For example, the carry-in/out section 9 may be configured to transport the container group 7 handed over thereto from the container group supporter 2, to the outside of the transport facility F.

Lifting Device

The lifting device 3 is mounted on the travel body 1. The lifting device 3 is configured to lift the containers 70 of the container group 7 supported by the container group supporter 2, or in other words, the containers 70 of the container group 7 disposed in the stacking region 2A.

The lifting device 3 includes a lifting mast 30 provided standing upward from the travel body 1, a lifting elevation body 30B coupled to the lifting mast 30, and a lifting elevation body driver 30M that moves the lifting elevation body 30B up and down along the lifting mast 30. Although a detailed illustration has been omitted, the lifting elevation body driver 30M includes, for example, an endless body, such as a belt, coupled to the lifting elevation body 30B, a rotational body around which the endless body is wound, and a motor that rotationally drives the rotational body.

Figure 11:
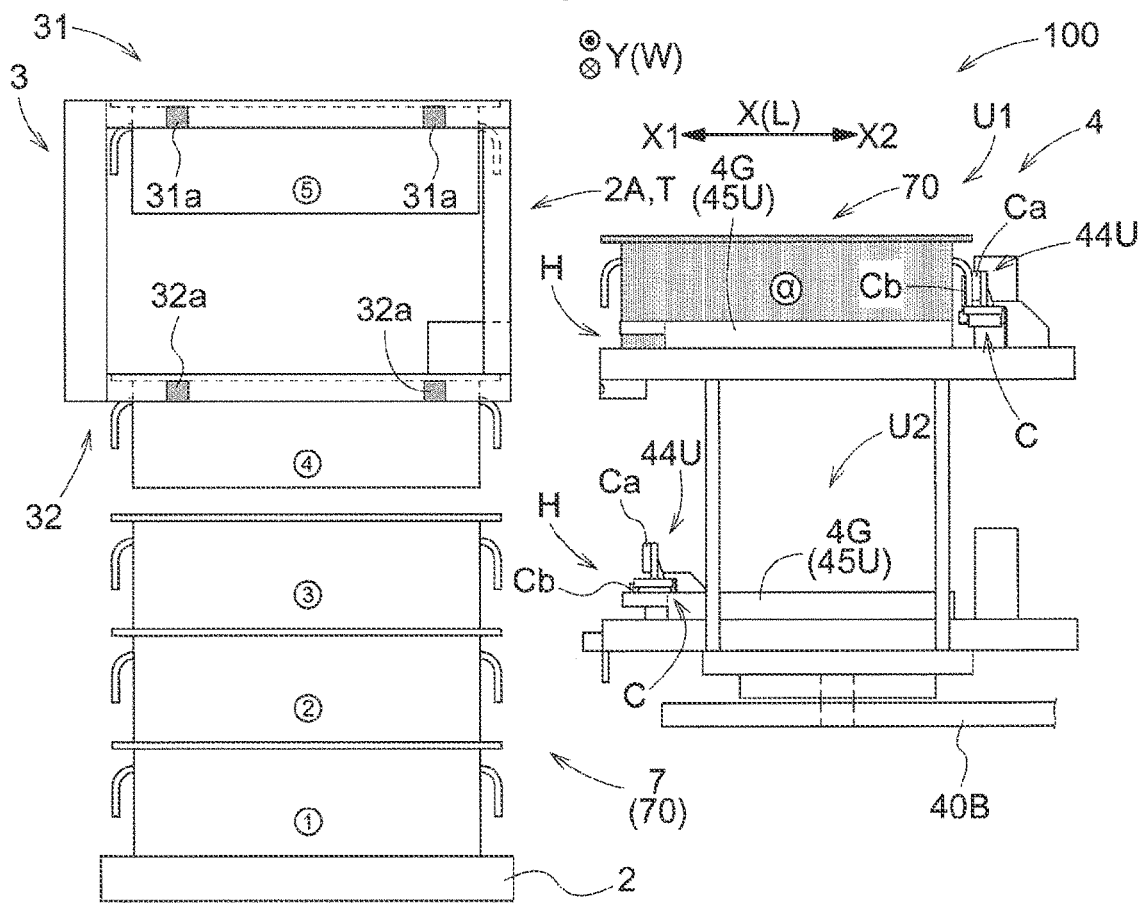
FIG. 11 is an explanatory diagram illustrating a case where a parallel operation for scooping up containers from and unloading containers to a stacking region is performed.

The lifting device 3 includes a first lifting mechanism 31 that lifts a container 70 located at a given height, included in the container group 7 stacked in the stacking region 2A, relative to the container 70 underneath and adjacent thereto, and a second lifting mechanism 32 that lifts a container 70 underneath the container 70 lifted by the first lifting mechanism 31, relative to the container 70 underneath and adjacent thereto. In the present embodiment, the first lifting mechanism 31 and the second lifting mechanism 32 are spaced apart from each other in the vertical direction. Accordingly, as shown in FIG. 11, for example, a space can be formed in the vertical direction between the container 70 lifted by the first lifting mechanism 31 and the container 70 lifted by the second lifting mechanism 32. A vertical space can also be formed below the container 70 lifted by the second lifting mechanism 32.

In the present embodiment, the lifting device 3 includes a first frame part 31F and a second frame part 32F that protrude in the vehicle front-rear direction L from the lifting elevation body 30B toward the stacking region 2A, and a coupling frame part 33F that couples the first frame part 31F and the second frame part 32F to each other. The first frame part 31F and the second frame part 32F are disposed at an interval in the vertical direction. The first frame part 31F is disposed above the second frame part 32F. The coupling frame part 33F couples the first frame part 31F and the second frame part 32F to each other in the vertical direction. This configuration prevents the first frame part 31F and the second frame part 32F from moving relative to each other, and thus the vertical interval between the first frame part 31F and the second frame part 32F is always constant. The first frame part 31F, the second frame part 32F, and the coupling frame part 33F integrally move up and down as the lifting elevation body 30B moves up and down.

Although a detailed illustration has been omitted, in the present embodiment, the first frame part 31F includes a pair of first frame members 31Fa disposed at an interval in the vehicle width direction W. The pair of first frame members 31Fa are disposed so as to accommodate the width (length in the vehicle width direction W) of the container 70 disposed in the stacking region 2A. The second frame part 32F includes a pair of second frame members 32Fa disposed at an interval in the vehicle width direction W. The pair of second frame members 32Fa are disposed so as to accommodate the width of the container 70 disposed in the stacking region 2A. The coupling frame part 33F includes coupling frame members 33Fa. The coupling frame members 33Fa couple the first frame members 31Fa and the second frame members 32Fa that are arranged in the vertical direction.

As shown in FIG. 11, in the present embodiment, the first lifting mechanism 31 includes first lifting holders 31a that hold the container 70, and a first lifting driver (not shown) that changes the orientation of the first lifting holders 31a. Although a detailed illustration has been omitted, the first lifting driver is configured to change the orientation of the first lifting holders 31a between a holding orientation in which the first lifting holders 31a hold the container 70, and a non-holding orientation in which the first lifting holders 31a do not hold the container 70. In FIG. 11, the first lifting holders 31a are in the holding orientation.

Similarly, the second lifting mechanism 32 includes second lifting holders 32a that hold the container 70, and a second lifting driver (not shown) that changes the orientation of the second lifting holders 32a. Although a detailed illustration has been omitted, the second lifting driver is configured to change the orientation of the second lifting holders 32a between a holding orientation in which the second lifting holders 32a hold the container 70, and a non-holding orientation in which the second lifting holders 32a do not hold the container 70. In FIG. 11, the second lifting holders 32a are in the holding orientation.

Here, in FIG. 11, numerals "1 to 5" are assigned to the containers 70 stacked in the stacking region 2A, in the order from bottom to top. In addition, the character "α" is assigned to the container 70 held by the transfer device 4.

Figure 12:
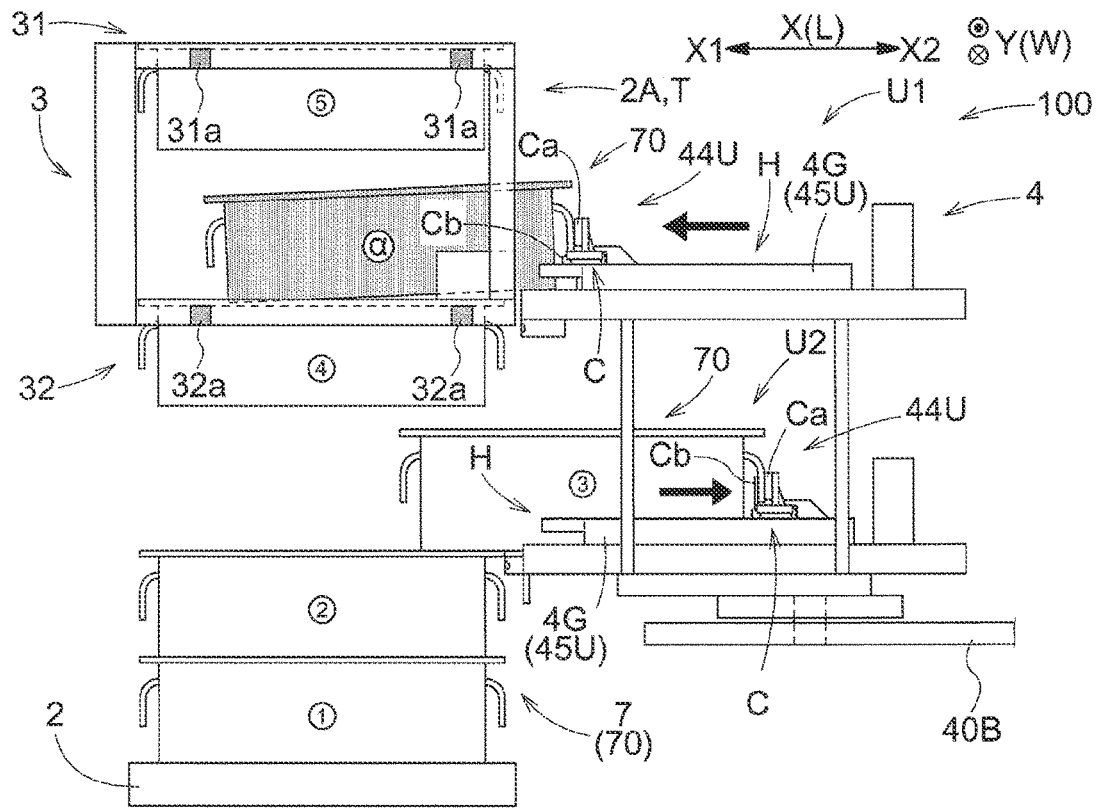
FIG. 12 is an explanatory diagram illustrating a case where a parallel operation for scooping up containers from and unloading containers to a stacking region is performed.

When a space is formed in the vertical direction between the container 70 lifted by the first lifting mechanism 31 and the container 70 lifted by the second lifting mechanism 32, another container 70 can be unloaded into the space. That is, on the container 70 lifted by the second lifting mechanism 32, another container 70 can be stacked by the transfer device 4. FIG. 12 shows an example in which the container 70 (container "α") held by the transfer device 4 is unloaded into a space formed in the vertical direction between the container 70 (container "5") lifted by the first lifting mechanism 31 and the container 70 (container "4") lifted by the second lifting mechanism 32.

When a vertical space is formed below the container 70 lifted by the second lifting mechanism 32, the space can be used to scoop up the container 70 disposed below the container 70 lifted by the second lifting mechanism 32. FIG. 12 shows an example in which the container 70 (container "3") disposed below the container 70 (container "4") lifted by the second lifting mechanism 32 is scooped up. Note that the unloading operation and the scooping operation for unloading and scooping up the container 70 to and from the stacking region 2A will be described later.

Transfer Device

As shown in FIG. 3, the transfer device 4 is mounted on the travel body 1. The transfer device 4 includes a holder H that holds the container 70, and is configured to perform a transfer operation including an unloading operation for transferring the container 70 from the holder H to the transfer target location T, and a scooping operation for transferring the container 70 from the transfer target location T to the holder H. In the present embodiment, the transfer target location T includes the stacking region 2A and the rack sections 80 of the container rack 8.

Here, "transfer direction X" is a movement direction of the container 70 that is transferred by the transfer device 4, and "width direction Y" is a direction orthogonal to the transfer direction X in a vertical view taken in the vertical direction. "Transfer-direction unloading side X1" is a side extending from the holder H toward the transfer target location T in the transfer direction X, and "transfer-direction scooping side X2" is a side extending from the transfer target location T toward the holder H in the transfer direction X. The transfer direction X is a direction extending in the horizontal direction. In the present example, the width direction Y is also a direction extending in the horizontal direction. The transfer-direction unloading side X1 is a side to which a container 70 moves in the transfer direction X when the container 70 is unloaded. The transfer-direction scooping side X2 is a side to which a container 70 moves in the transfer direction X when the container 70 is scooped up.

Figure 4:
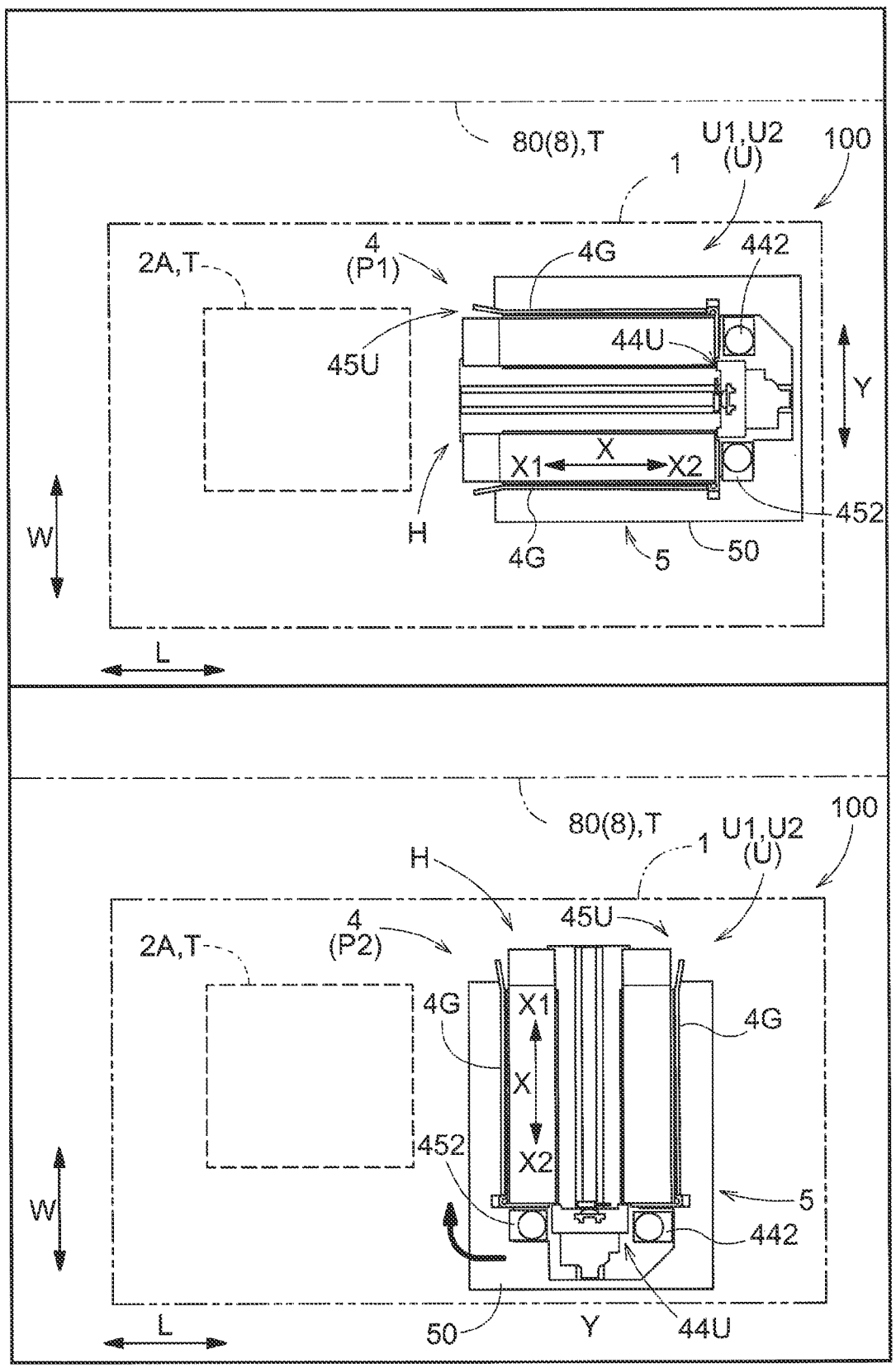
FIG. 4 is a plan view showing a first orientation and a second orientation of a transfer device.

In the present embodiment, the transport vehicle 100 includes a turning device 5 that turns the transfer device 4 about an axis extending in the vertical direction. As shown in FIG. 4, the turning device 5 is configured to turn the transfer device 4 about an axis extending in the vertical direction so as to change the orientation of the transfer device 4 between a first orientation P1 in which the transfer-direction unloading side X1 is directed toward the stacking region 2A, and a second orientation P2 in which the transfer-direction unloading side X1 is directed towards the container rack 8. Thus, in the present embodiment, the transfer direction X may be changed in a horizontal plane by the turning device 5.

In the present embodiment, the orientation of the transfer device 4 is changed according to the position of the transfer target location T. Specifically, the transfer device 4 is in the first orientation P1 when the transfer target location T is the stacking region 2A, and is in the second orientation P2 when the transfer target location T is the container rack 8 (rack section 80). As shown in FIG. 3, in the present example, the turning device 5 includes a turning base 50 that supports the transfer device 4, a turning shaft 51 that supports the turning base 50 so as to be turnable relative to the transfer elevation body 40B, and a turning driver (not shown) that drives the turning shaft 51.

As shown in FIG. 3, the transfer device 4 includes a holder H that holds the container 70, a transfer unit 44U that moves the container 70 in the transfer direction X between the holder H and the transfer target location T, a guide unit 45U that guides, in the transfer direction X, the container 70 that is moved between the holder H and the transfer target location T, and a body B that supports the transfer unit 44U, the guide unit 45U, and the holder H.

In the present embodiment, the transfer device 4 includes a transfer mast 40 fixed to the travel body 1 and extending in the vertical direction, a transfer elevation body 40B that moves up and down along the transfer mast 40, and a transfer elevation body driver 40M that elevates and lowers the transfer elevation body 40B along the transfer mast 40. The body B that supports the transfer unit 44U, the guide unit 45U, and the holder H is coupled to the transfer elevation body 40B. This configuration allows the transfer device 4 to move the transfer unit 44U, the guide unit 45U, and the holder H in the vertical direction, thus transferring the container 70 to each of the rack sections 80 arranged in a plurality of rows (see FIG. 2).

In the present embodiment, a pair of bodies B spaced apart from each other in the vertical direction are coupled to the transfer elevation body 40B. Each of the two bodies B supports a transfer unit 44U, a guide unit 45U, and a holder H. That is, in the present embodiment, the transfer device 4 includes a plurality of (two in the present example) units U each including a body B, a transfer unit 44U, a guide unit 45U, and a holder H. The units U include a first unit U1, and a second unit U2 disposed below the first unit U1. The first unit U1 and the second unit U2 have structures similar to each other. In the following, the first unit U1 and the second unit may be collectively referred to as a "unit U".

In the present embodiment, the transfer device 4 includes a holding coupling part 43 that couples the first unit U1 and the second unit U2 to each other in the vertical direction. The holding coupling part 43 couples the first unit U1 and the second unit U2 to each other such that the vertical interval therebetween is constant. In the illustrated example, the holding coupling part 43 couples the holder H of the first unit U1 and the holder H of the second unit U2 to each other. Thus, in the present embodiment, the transfer device 4 includes a plurality of units U that are arranged in the vertical direction.

Figure 5:
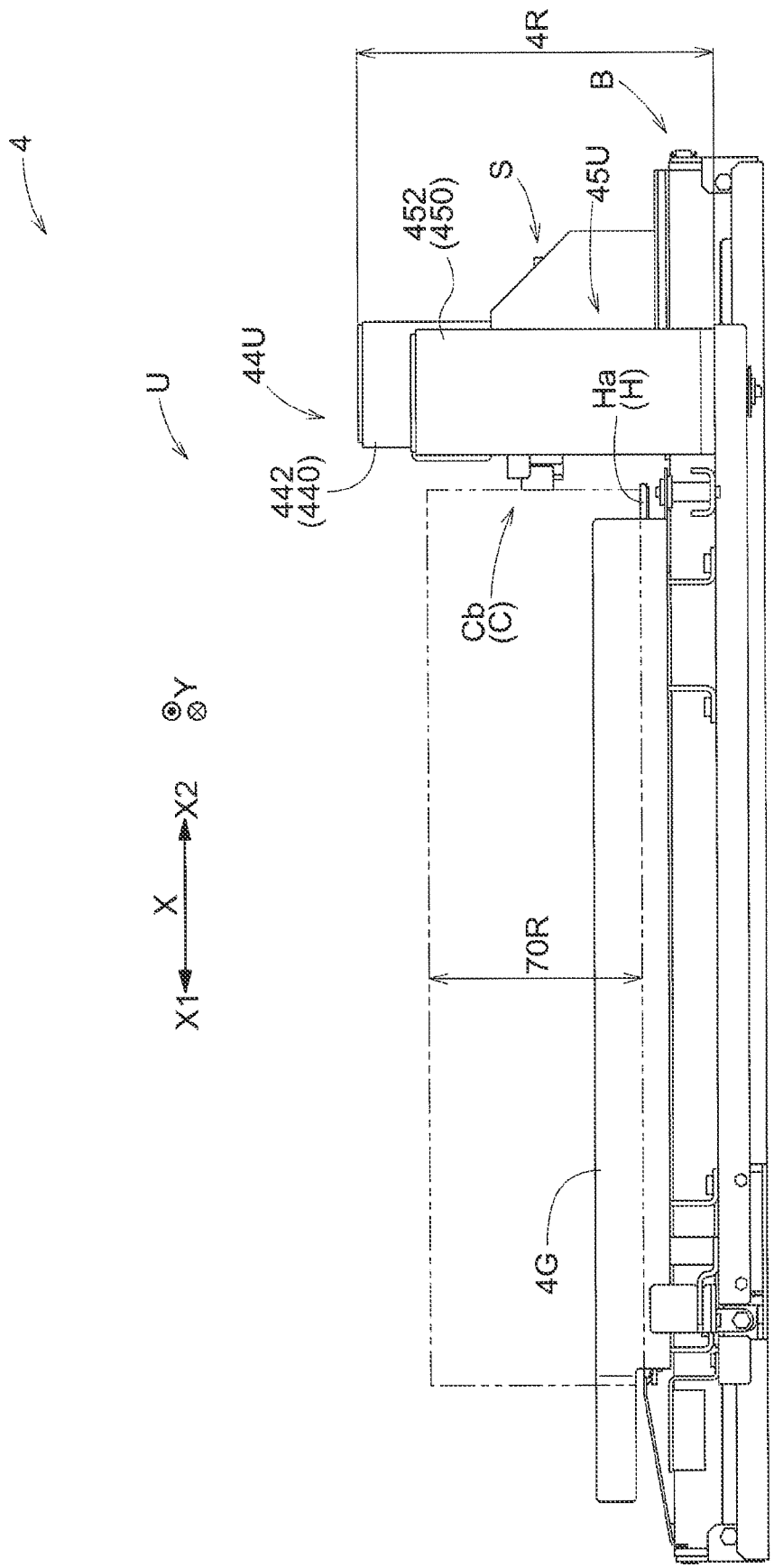
FIG. 5 is a diagram showing relevant parts of the transfer device as viewed in a width direction.
Figure 6:
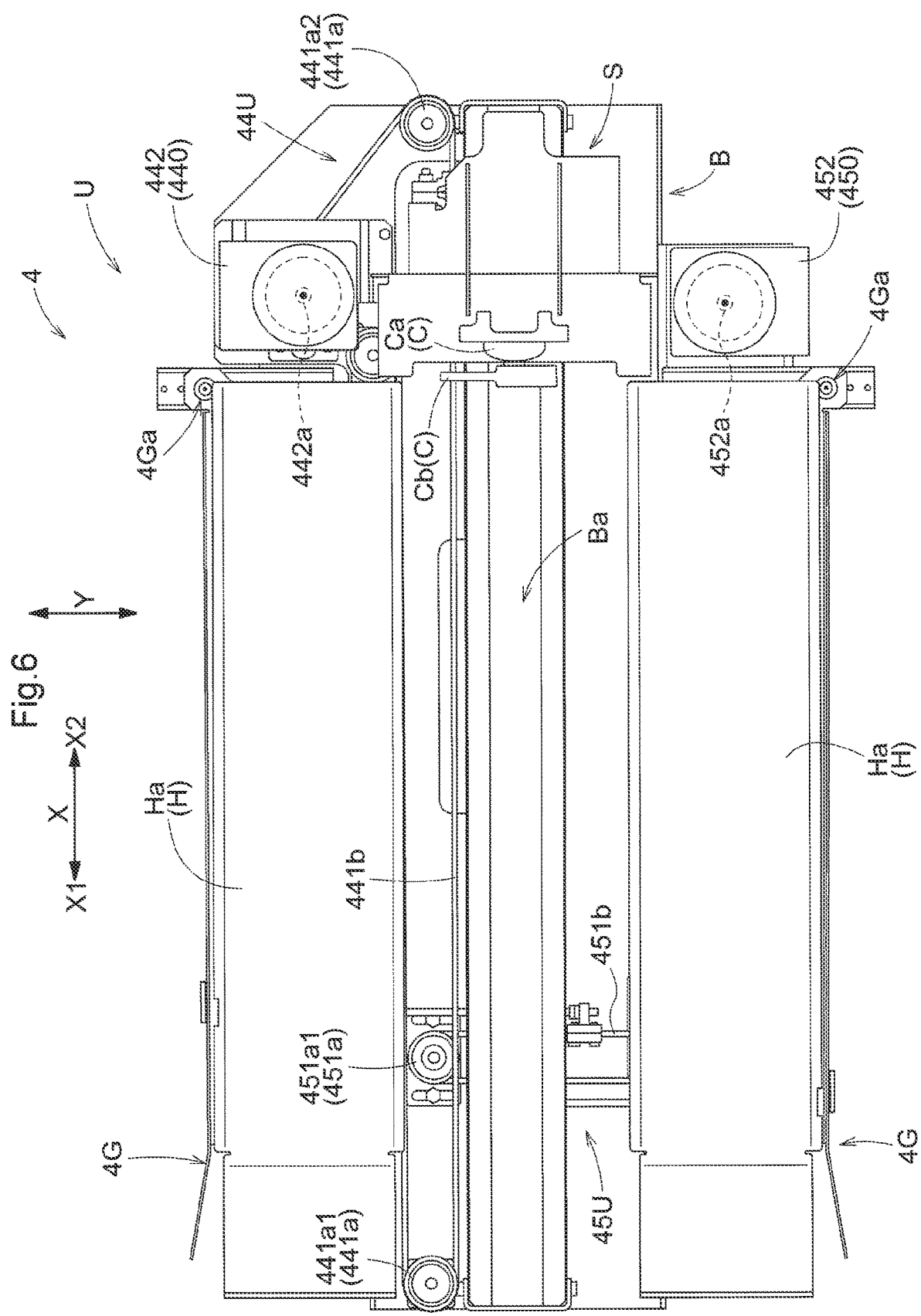
FIG. 6 is a plan view showing relevant parts of the transfer device.
Figure 7:
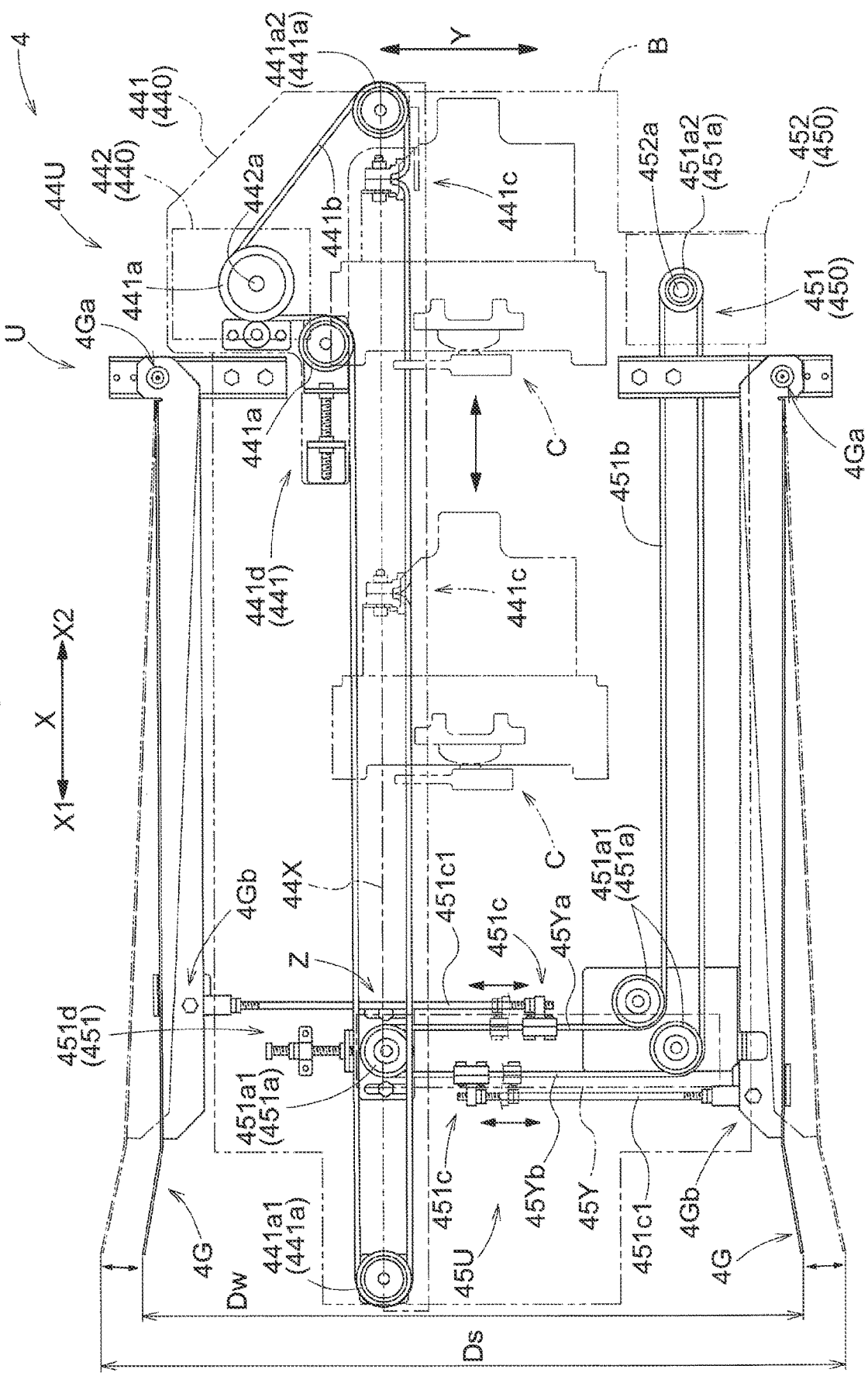
FIG. 7 is a plan view showing a transfer drive transmission mechanism and a guide drive transmission mechanism.

With reference mainly to FIGS. 5 to 7, the structure of each unit U including a body B, a transfer unit 44U, a guide unit 45U, and a holder H will be described in detail below.

FIG. 5 is a diagram showing the unit U as viewed in the width direction Y, and FIG. 6 is a diagram showing the unit U in a plan view. FIG. 7 is a diagram for describing relevant parts of a transfer drive transmission mechanism 441 and a guide drive transmission mechanism 451, which will be described later, with elements unnecessary for the description omitted from the unit U shown in FIG. 6.

As described above, the unit U includes a body B, a transfer unit 44U, a guide unit 45U, and a holder H.

The holder H is supported by the body B. In the present embodiment, the holder H includes a pair of holding plates Ha that are spaced apart from each other in the width direction Y. A space for allowing a contact section C, which will be described later, to move in the transfer direction X is formed between the two holding plates Ha in the width direction Y. The holder H is configured to support a container 70 from below using the pair of holding plates Ha, thus holding the container 70. Although a detailed illustration has been omitted, in the present example, a central portion of the container 70 in the width direction Y is lifted in a state in which opposite side portions of the container 70 in the width direction Y are supported by the two holding plates Ha.

The transfer unit 44U includes a contact section C that comes into contact with the container 70 so as to move the container 70 in the transfer direction X during the transfer operation, and a transfer driver 440 that causes the contact section C to reciprocate in the transfer direction X.

The contact section C is disposed above the holder H, and is movable relative to the holder H in the transfer direction X. In the present embodiment, the contact section C is supported by the body B via a support member S. The body B includes a transfer rail Ba disposed in the transfer direction X, and the support member S is movable along the transfer rail Ba. In the present example, the support member S is configured to be caused to reciprocate along the transfer rail Ba by being driven by the transfer driver 440. The contact section C moves in the transfer direction X as the support member S moves along the transfer rail Ba. In the present example, the transfer rail Ba is disposed between the two pair of holding plates Ha in the width direction Y, in a vertical view. The contact section C is configured to be caused to reciprocate in the transfer direction X between the two holding plates Ha in the width direction Y.

In the present embodiment, the contact section C includes a pressing part Ca that presses the container 70 toward the transfer-direction unloading side X1 when performing the unloading operation for the container 70, and a locking part Cb that is locked to the container 70 so as to pull the container 70 toward the transfer-direction scooping side X2 when performing the scooping operation for the container 70.

The pressing part Ca moves toward the transfer-direction unloading side X1 relative to the holder H, thus pressing a container 70 that is to be unloaded toward the transfer-direction unloading side X1. In the present embodiment, the pressing part Ca is supported by the support member S so as to be located above the locking part Cb.

The locking part Cb moves toward the transfer-direction scooping side X2 relative to the holder H, thus pulling a container 70 that is to be scooped up toward the transfer-direction scooping side X2. The locking part Cb is supported by the support member S so as to be located below the pressing part Ca. Hereinafter, the pressing part Ca and the locking part Cb may be collectively referred to as a "contact section C".

The transfer driver 440 includes a transfer drive transmission mechanism 441 drivingly coupled to the contact section C, and a transfer drive source 442 that drives the transfer drive transmission mechanism 441.

As shown in FIG. 7, in the present embodiment, the transfer drive transmission mechanism 441 includes a plurality of transfer rotational bodies 441a rotatably supported to the body B, and an endless transfer transmission member 441b wound around the plurality of transfer rotational bodies 441a. In the present example, each transfer rotational body 441a is configured as a pulley. The transfer transmission member 441b is configured as a belt. The rotational shafts of the plurality of transfer rotational bodies 441a extend in the vertical direction.

One or more of the plurality of transfer rotational bodies 441a are rotationally driven by the transfer drive source 442. In the present example, one transfer rotational body 441a is rotationally driven by the transfer drive source 442, and the rest of the transfer rotational bodies 441a are driven to be rotated by a driving force transmitted by the transfer transmission member 441b.

At least one of the plurality of transfer rotational bodies 441a serves as an unloading-side transfer rotational body 441a1 disposed on the transfer-direction unloading side X1 relative to a central portion of the holder H (see FIG. 6) in the transfer direction X. In the present example, the unloading-side transfer rotational body 441a1 is disposed in a region in the transfer direction X that corresponds to an end region of the holder H on the transfer-direction unloading side X1.

At least one of the plurality of transfer rotational bodies 441a serves as a scooping-side transfer rotational body 441a2 disposed on the transfer-direction scooping side X2 relative to the central portion of the holder H in the transfer direction X. In the present example, the scooping-side transfer rotational body 441a2 is disposed on the transfer-direction scooping side X2 relative to the holder H.

In the present embodiment, the transfer rotational body 441a that is rotationally driven by the transfer drive source 442 is one of the transfer rotational bodies 441a excluding the unloading-side transfer rotational body 441a1 and the scooping-side transfer rotational body 441a2. In the present example, one of the plurality of transfer rotational bodies 441a serves the function of adjusting the arrangement position and the tension of the transfer transmission member 441b. The transfer drive transmission mechanism 441 includes a tension adjustor 441d that adjusts the tension of the transfer transmission member 441b by changing the position of the transfer rotational body 441a. In the illustrated example, the tension adjustor 441d is configured to change the position of one of the plurality of transfer rotational bodies 441a, thereby changing the pressing force that the transfer rotational body 441a applies to the transfer transmission member 441b. In the illustrated example, the transfer rotational body 441a that is moved by the tension adjustor 441d is a transfer rotational body 441a that is different from the transfer rotational body 441a rotationally driven by the transfer drive source 442, the unloading-side transfer rotational body 441a1, and the scooping-side transfer rotational body 441a2.

In the present embodiment, a portion of the transfer transmission member 441b is provided with a transfer-direction arrangement region 44X disposed in the transfer direction X, and the contact section C is coupled to the transfer-direction arrangement region 44X. In the present example, the unloading-side transfer rotational body 441a1 and the scooping-side transfer rotational body 441a2 are disposed at the same position in the width direction Y so as to be spaced apart from each other in the transfer direction X. A region of the transfer transmission member 441b that extends between the unloading-side transfer rotational body 441a1 and the scooping-side transfer rotational body 441a2 serves as the transfer-direction arrangement region 44X. A transfer coupling part 441c for coupling the contact section C is provided in the transfer-direction arrangement region 44X. The transfer coupling part 441c is caused to reciprocate in the transfer direction X together with the contact section C by the driving of the transfer transmission member 441b.

As shown in FIGS. 5 and 6, the guide unit 45U includes a pair of guide sections 4G disposed on opposite sides, in the width direction Y, of the container 70 held by the holder H, and a guide driver 450 that changes the interval between the two guide sections 4G in the width direction Y.

The pair of guide sections 4G protrude upward of support surfaces of the pair of holding plates Ha that support the container 70. Accordingly, the two guide sections 4G are disposed on opposite sides in the width direction Y relative to the container 70 supported by the pair of holding plates Ha. In other words, each of the two guide sections 4G opposes, in the width direction Y, a surface of the container 70 that faces outward in the width direction Y.

As shown in FIG. 7, in the present embodiment, each guide section 4G is coupled to the body B so as to be turnable about an axis extending in the vertical direction. In the present example, each guide section 4G includes a fulcrum portion 4Ga serving as a turning center, and is coupled to the body B at the fulcrum portion 4Ga. Each guide section 4G includes an effort portion 4Gb disposed radially outward of the fulcrum portion 4Ga relative to the turning center. A force for turning the guide section 4G is applied to the effort portion 4Gb by the guide driver 450.

As described above, the guide driver 450 is configured to change the interval between the two guide sections 4G in the width direction Y. More precisely, in the present example, the interval between the two guide sections 4G in the width direction Y does not change between the fulcrum portions 4Ga serving as the respective turning centers of the guide sections 4G, but changes between portions of the guide sections 4G that are located radially outward of the fulcrum portions 4Ga. However, in the following, "the interval between the two guide sections 4G in the width direction Y changes" when the interval between the two guide sections 4G in the width direction Y changes between the portions located radially outward of the fulcrum portions 4Ga.

In the present embodiment, the guide driver 450 is configured to change the interval between the two guide sections 4G in the width direction Y, between a reference interval Ds when each of the guide sections 4G is disposed in the transfer direction X, and a wide interval Dw that is wider than the reference interval Ds. In the present example, the guide driver 450 changes the interval between the two guide sections 4G in the width direction Y between the reference interval Ds and the wide interval Dw by turning the guide sections 4G in synchronization with each other.

The guide driver 450 includes a guide drive transmission mechanism 451 drivingly coupled to the pair of guide sections 4G, and a guide drive source 452 that drives the guide drive transmission mechanism 451.

As shown in FIG. 7, in the present embodiment, the guide drive transmission mechanism 451 includes a plurality of guide rotational bodies 451a rotatably supported to the body B, and an endless guide transmission member 451b wound around the plurality of guide rotational bodies 451a. In the present example, each guide rotational body 451a is configured as a pulley. The guide transmission member 451b is configured as a belt. The rotational shafts of the plurality of guide rotational bodies 451a extend in the vertical direction.

One or more of the plurality of guide rotational bodies 451a are rotationally driven by the guide drive source 452. In the present example, one guide rotational body 451a is rotationally driven by the guide drive source 452, and the rest of the guide rotational bodies 451a are driven to be rotated by a driving force transmitted by the guide transmission member 451b.

At least one of the plurality of guide rotational bodies 451a serves as a scooping-side guide rotational body 451a2 disposed on the transfer-direction scooping side X2 relative to the central portion, in the transfer direction X, of the holder H (see FIG. 6). In the present example, the scooping-side guide rotational body 451a2 is disposed on the transfer-direction scooping side X2 relative to the holder H.

At least two of the plurality of guide rotational bodies 451a serve as unloading-side guide rotational bodies 451a1 disposed on the transfer-direction unloading side X1 relative to the scooping-side guide rotational body 451a2. In the present example, three of the plurality of guide rotational bodies 451a serve as the unloading-side guide rotational bodies 451a1.

In the present embodiment, one of the plurality of guide rotational bodies 451a serves the function of adjusting the arrangement position and the tension of the guide transmission member 451b. The guide drive transmission mechanism 451 includes a tension adjustor 451d that adjusts the tension of the guide transmission member 451b by changing the position of the guide rotational body 451a. In the illustrated example, the tension adjustor 451d is configured to change the position of one of the plurality of guide rotational bodies 451a, thereby changing the pressing force that the guide rotational body 451a applies to the guide transmission member 451b. In the illustrated example, the guide rotational body 451a that is moved by the tension adjustor 451d is an unloading-side guide rotational body 451a1, included in the plurality of unloading-side guide rotational bodies 451a1, that is disposed at a folded end of the guide transmission member 451b. With this configuration, it is possible to favorably adjust the tension of the guide transmission member 451b such that a width-direction arrangement region 45Y (described later) of the guide transmission member 451b is appropriately disposed in the width direction Y.

Two of the plurality of unloading-side guide rotational bodies 451a1 are disposed at the same position in the transfer direction X so as to be spaced apart from each other in the width direction Y. A region of the guide transmission member 451b that extends between the two unloading-side guide rotational bodies 451a1 serves as a width-direction arrangement region 45Y. Thus, in the present embodiment, a portion of the guide transmission member 451b is provided with the width-direction arrangement region 45Y disposed in the width direction Y. In the present example, the region disposed in the width direction Y is formed as a result of the guide transmission member 451b being bent by three unloading-side guide rotational bodies 451a1 relative to portions thereof disposed in the transfer direction X.

The width-direction arrangement region 45Y includes a first portion 45Ya, and a second portion 45Yb disposed parallel to the first portion 45Ya and constituting a portion that is bent in the width direction Y by one unloading-side guide rotational body 451a1. The first portion 45Ya and the second portion 45Yb are configured to move toward sides opposite to each other in the width direction Y when the guide transmission member 451b is driven by the guide drive source 452.

Each of the two pair of guide sections 4G is coupled to the width-direction arrangement region 45Y. In the present embodiment, guide coupling parts 451c for coupling the corresponding guide sections 4G to the width-direction arrangement region 45Y are provided. Each of the guide coupling parts 451c constitutes a coupling part between the width-direction arrangement region 45Y and the corresponding guide section 4G. Specifically, each of the guide coupling parts 451c is coupled to the effort portion 4Gb of the corresponding guide section 4G via a coupling member 451c1.

In the present embodiment, a guide coupling part 451c is provided in each of the first portion 45Ya and the second portion 45Yb of the width-direction arrangement region 45Y. One guide section 4G that is coupled to the guide coupling part 451c provided in the first portion 45Ya, and the other guide section 4G that is coupled the guide coupling part 451c provided in the second portion 45Yb are operated so as to move toward or away from each other as a result of the guide transmission member 451b being driven. In the illustrated example, each coupling member 451c1 that couples a guide coupling part 451c and the corresponding guide section 4G to each other is configured using a rod that is disposed in the width direction Y. One end portion of the coupling member 451c1 is coupled to the effort portion 4Gb of the guide section 4G, and the other end portion of the coupling member 451c1 is coupled to the guide coupling part 451c provided in the width-direction arrangement region 45Y of the guide transmission member 451b. Accordingly, a force for turning the guide section 4G is applied to the effort portion 4Gb via the coupling member 451c1.

The transfer drive transmission mechanism 441 and the guide drive transmission mechanism 451 have an intersection portion Z where the transfer drive transmission mechanism 441 and the guide drive transmission mechanism 451 intersect each other in the vertical view, and the transfer drive transmission mechanism 441 and the guide drive transmission mechanism 451 are disposed adjacent to each other in the vertical direction at the intersection portion Z. In the present embodiment, the transfer transmission member 441b and the guide transmission member 451b have the intersection portion Z. Specifically, the intersection portion Z is formed by a portion of the transfer-direction arrangement region 44X of the transfer transmission member 441b, and a portion of the width-direction arrangement region 45Y of the guide transmission member 451b. Accordingly, only endless transmission members (the transfer transmission member 441b and the guide transmission member 451b) need to be provided as the respective members of the transfer drive transmission mechanism 441 and the guide drive transmission mechanism 451 that are disposed in the intersection portion Z. Thus, with this configuration, the vertical size of the intersection portion Z can be easily reduced, and thus the vertical size of the transfer device 4 can be easily reduced.

In the present embodiment, the contact section C coupled to the transfer-direction arrangement region 44X of the transfer transmission member 441b is disposed above the transfer transmission member 441b, and is caused to reciprocate in the extension direction (transfer direction X) of the transfer-direction arrangement region 44X. That is, the contact section C is caused to reciprocate above the transfer transmission member 441b in the transfer direction X. In the present embodiment, the transfer transmission member 441b is above the guide transmission member 451b. Accordingly, the presence of the guide transmission member 451b will not obstruct the contact section C moving above the transfer transmission member 441b in the transfer direction X. Thus, with the above-described configuration, it is possible to secure a large movement range for the contact section C that moves along the transfer transmission member 441b, while arranging the transfer transmission member 441b and the guide transmission member 451b in an appropriate positional relationship. This makes it possible to secure a large movement range for the container 70 that is moved in the transfer direction X by the contact section C. In other words, it is possible to flexibly set the movement range of the container 70 in the transfer direction X according to the layout of the facility.

Here, as shown in FIGS. 5 and 6, the transfer drive source 442 and the guide drive source 452 are disposed on the transfer-direction scooping side X2 relative to the holder H.

Accordingly, the vertical size of the transfer device 4 can be kept small as compared with a case where the transfer drive source 442 and the guide drive source 452 are disposed overlapping with the holder H in a vertical view. In addition, as compared with a case where the transfer drive source 442 and the guide drive source 452 are disposed on the transfer-direction unloading side X1 relative to the holder H, the presence of the drive sources 442 and 452 is less likely to obstruct the transfer of the container 70. In the present embodiment, the transfer drive source 442 and the guide drive source 452 are disposed so as not to interfere with a movement trajectory of the contact section C. More specifically, the transfer drive source 442 and the guide drive source 452 are disposed separately on opposite sides in the width direction Y relative to a movement trajectory of the contact section C. This makes it possible to secure a large movement range for the contact section C in the transfer direction X, while minimizing an increase in the size of the transfer device 4 in the transfer direction X.

In the present embodiment, the transfer drive source 442 and the guide drive source 452 are electric motors respectively including rotational shafts 442a and 452a (see FIG. 6). The rotational shafts 442a and 452a of the transfer drive source 442 and the guide drive source 452 extend in the vertical direction. This facilitates a reduction in the horizontal size of the transfer device 4.

As shown in FIG. 5, in the present embodiment, an arrangement region 4R in the vertical direction (hereinafter referred to as a "drive source arrangement region 4R") of both the transfer drive source 442 and the guide drive source 452 overlaps an arrangement region 70R in the vertical direction (hereinafter referred to as a "container arrangement region 70R") of the container 70 held by the holder H. This facilitates a reduction in the vertical size of the transfer device 4. Note that the term "overlap" used here refers to a concept encompassing a case where the drive source arrangement region 4R and the container arrangement region 70R partially overlap each other.

In the present embodiment, the drive source arrangement region 4R is a vertical region extending from the most downward lower end portion of a lower end portion of the transfer drive source 442 and a lower end portion of the guide drive source 452, to the most upward end portion of an upper end portion of the transfer drive source 442 and an upper end portion of the guide drive source 452. In the example shown in FIG. 5, a vertical region extending from the lower end portion of the guide drive source 452 to the upper end portion of the transfer drive source 442 serves as the drive source arrangement region 4R. In the present embodiment, the container arrangement region 70R is a vertical region extending from a lower end portion to an upper end portion of the container 70 held by the holder H. In the illustrated example, the container arrangement region 70R is smaller than the drive source arrangement region 4R. However, the size relationship between these two regions may change according to the vertical size of containers 70 that are be handled.

Transfer Operation

Next, the transfer operation of the transfer device 4 for transferring the container 70 will be described. FIGS. 8 to 13 are explanatory diagrams illustrating a case where the transfer device 4 performs a transfer operation (unloading operation or scooping operation) for transferring the container 70 to and from the transfer target location T.

Figure 8:
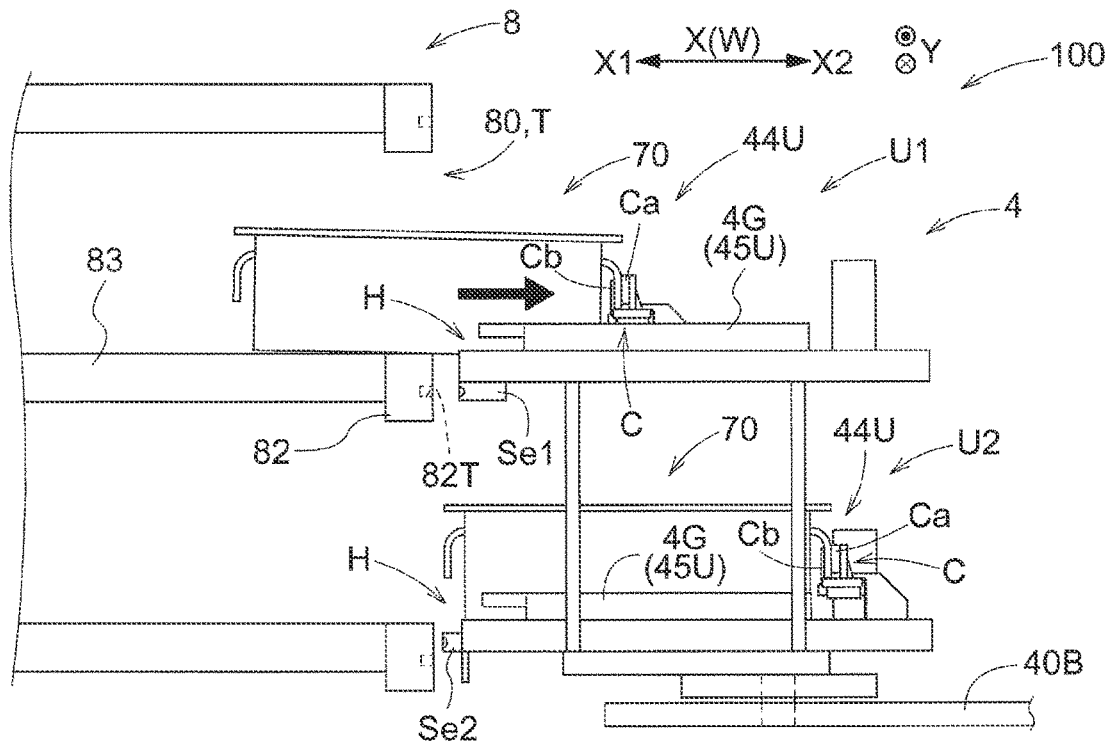
FIG. 8 is an explanatory diagram illustrating a scooping operation for scooping up a container from a rack section.
Figure 9:
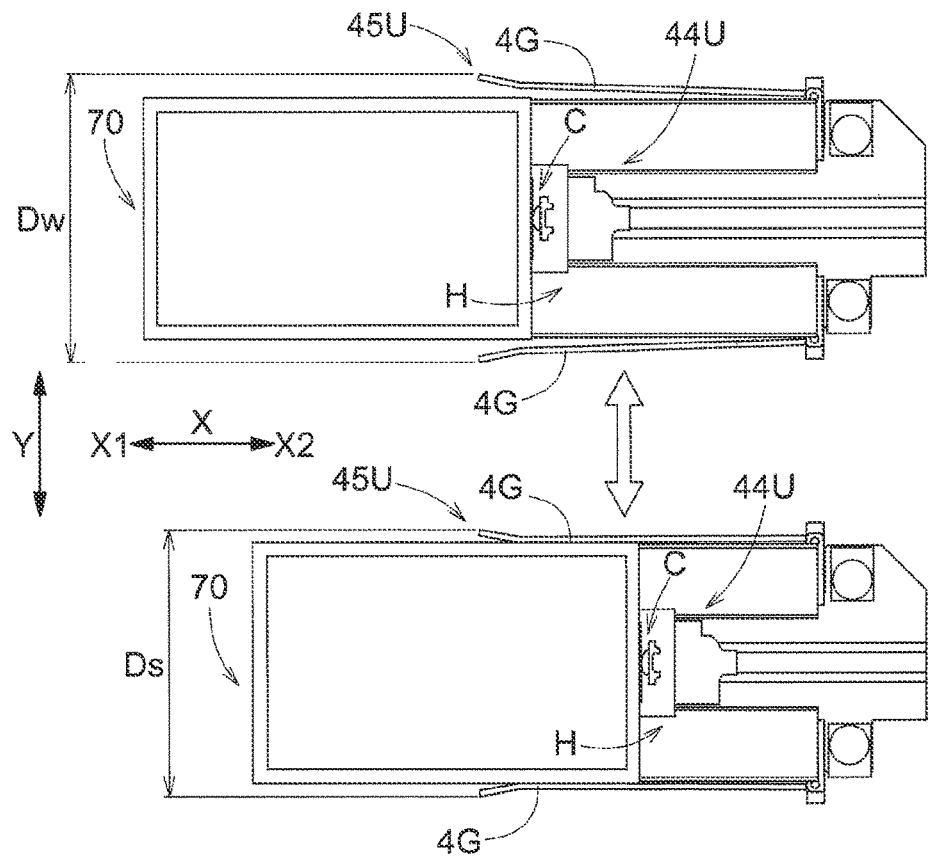
FIG. 9 is an explanatory diagram illustrating a scooping operation for scooping up a container from a rack section.

FIGS. 8 and 9 show a scooping operation (transfer operation) for scooping up a container 70 from the rack section 80, and illustrate a case where a container 70 stored in a rack section 80 is scooped up to the holder H by the transfer unit 44U of the first unit U1. In this case, the controller 6 (see FIG. 3) causes the position of the transfer unit 44U to be aligned with the reference position 80P (see FIG. 2) of the rack section 80, and subsequently causes the locking part Cb to pull the container 70 toward the transfer-direction scooping side X2. Specifically, the controller 6 sets the locking part Cb of the first unit U1 in a locking orientation, and causes the locking part Cb to move toward the transfer-direction scooping side X2 relative to the holder H, with the locking part Cb being locked to the container 70. Thus, the container 70 to be scooped up is pulled toward the holder H side.

In the present embodiment, the transfer device 4 includes a reference position detection sensor Se1 that detects the reference position 80P (see FIG. 2) of the rack section 80. As described above, the reference position 80P is a position of the rack section 80 that serves as a reference for storing the container 70.

The reference position detection sensor Se1 is configured to detect the target portion 82T provided on the beam member 82, thereby detecting the positional relationship between the transfer device 4 including the reference position detection sensor Se1, and the reference position 80P of the rack section 80. Based on a result of detection of the target portion 82T by the reference position detection sensor Se1, the travel body 1, the turning device 5, and the transfer elevation body driver 40M are controlled to perform an operation for correcting the position of the transfer device 4, whereby it is possible to appropriately transfer the container 70 to the rack section 80. In the present example, the reference position detection sensor Se1 is configured by a camera. Through image recognition of an image captured by the reference position detection sensor Se1 configured as a camera, it is possible to detect the positional relationship between the transfer device 4 and the target portion 82T provided on the beam member 82. For example, the reference position detection sensor Se1 may have the function of a range sensor that detects the distance to an object.

As shown in FIG. 9, in the present embodiment, when the transfer unit 44U performs the scooping operation for the container 70, the guide unit 45U causes the two guide sections 4G to move toward each other in the width direction Y. In other words, the guide unit 45U changes the interval between the two guide sections 4G from the wide interval Dw to the reference interval Ds, in parallel with the scooping operation for the container 70 performed by the transfer unit 44U. With this configuration, the container 70 that is moved from the transfer-direction unloading side X1 toward the transfer-direction scooping side X2 by the scooping operation can be appropriately guided to the holder H.

Figure 10:
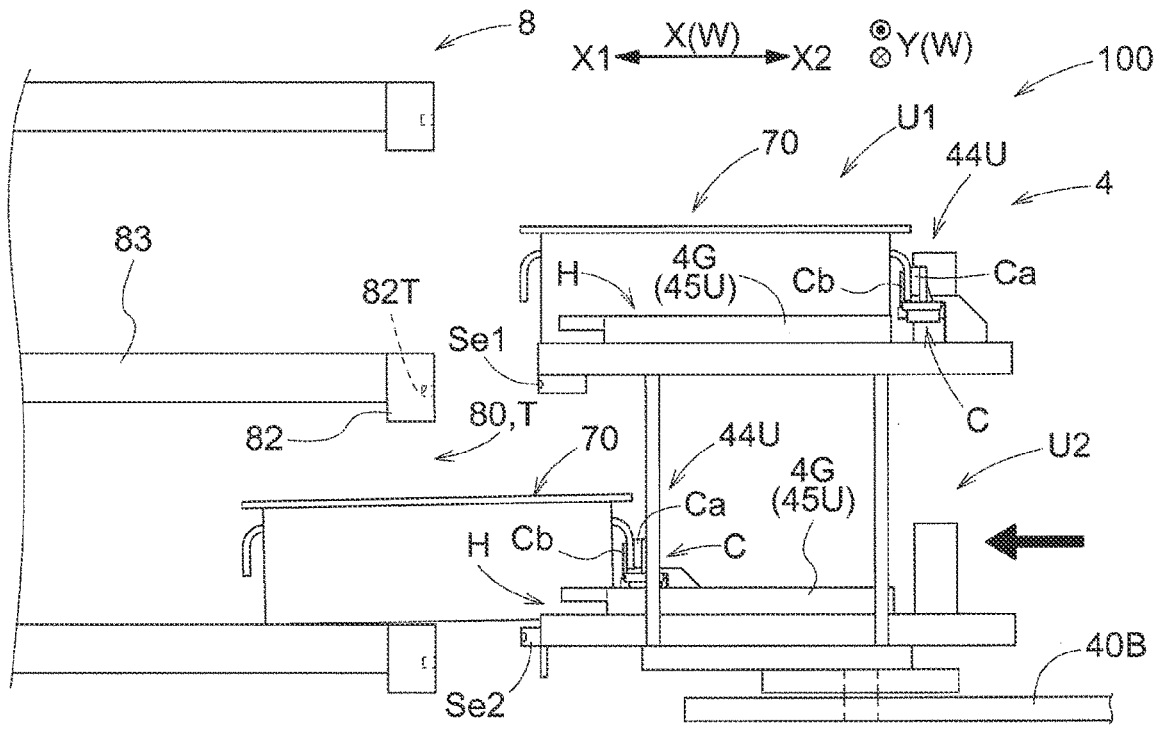
FIG. 10 is an explanatory diagram illustrating an unloading operation for unloading a container to a rack section.

FIG. 10 shows an unloading operation (transfer operation) for unloading a container 70 to a rack section 80, and illustrates a case where a container 70 held by a holder H is unloaded to a rack section 80 by the transfer unit 44U of a second unit U2. In this case, if the controller 6 (see FIG. 3) determines that no other container 70 is stored in the rack section 80 to which the container 70 is to be unloaded, the controller 6 causes the pressing part Ca to press the container 70 toward the transfer-direction unloading side X1. Specifically, the controller 6 causes the pressing part Ca of the second unit U2 to move to the transfer-direction unloading side X1 relative to the holder H, with the pressing part Ca being in contact with the container 70. Thus, the container 70 to be unloaded is pushed toward the rack section 80 (transfer target location T) side.

In the present embodiment, the transfer device 4 includes a storage container detection sensor Se2 that detects the container 70 stored in the rack section 80.

When the transfer device 4 performs the unloading operation for transferring a container 70 to a rack section 80, the storage container detection sensor Se2 detects whether or not any other container 70 is present in the rack section 80 to which the container 70 is to be transferred. If it is detected by the storage container detection sensor Se2 that no other container 70 is present in a target rack section 80 as a transfer destination, the transfer device 4 performs the unloading operation for unloading the container 70 to the rack section 80. If it is detected by the storage container detection sensor Se2 that another container 70 is present in the target rack section 80 as the transfer destination, the transfer device 4 may transfer the container 70 to another vacant rack section 80, or may stop the transfer. For example, the storage container detection sensor Se2 may be configured as a range sensor that detects the distance to a target. This makes it possible to perform the transfer operation while measuring the distance between transfer device 4 and the transfer target location T. In the present embodiment, the storage container detection sensor Se2 is configured as a photosensor that projects light toward a target. However, the present disclosure is not limited to such a configuration, and the storage container detection sensor Se2 may be configured, for example, using well-known means such as an ultrasonic sensor or a camera.

In the present embodiment, when the transfer unit 44U performs the unloading operation for the container 70, the guide unit 45U keeps the interval between the two guide sections 4G at the reference interval Ds. This makes it possible to appropriately guide the container 70 to be unloaded, to the rack section 80 (transfer target location T).

Figure 13:
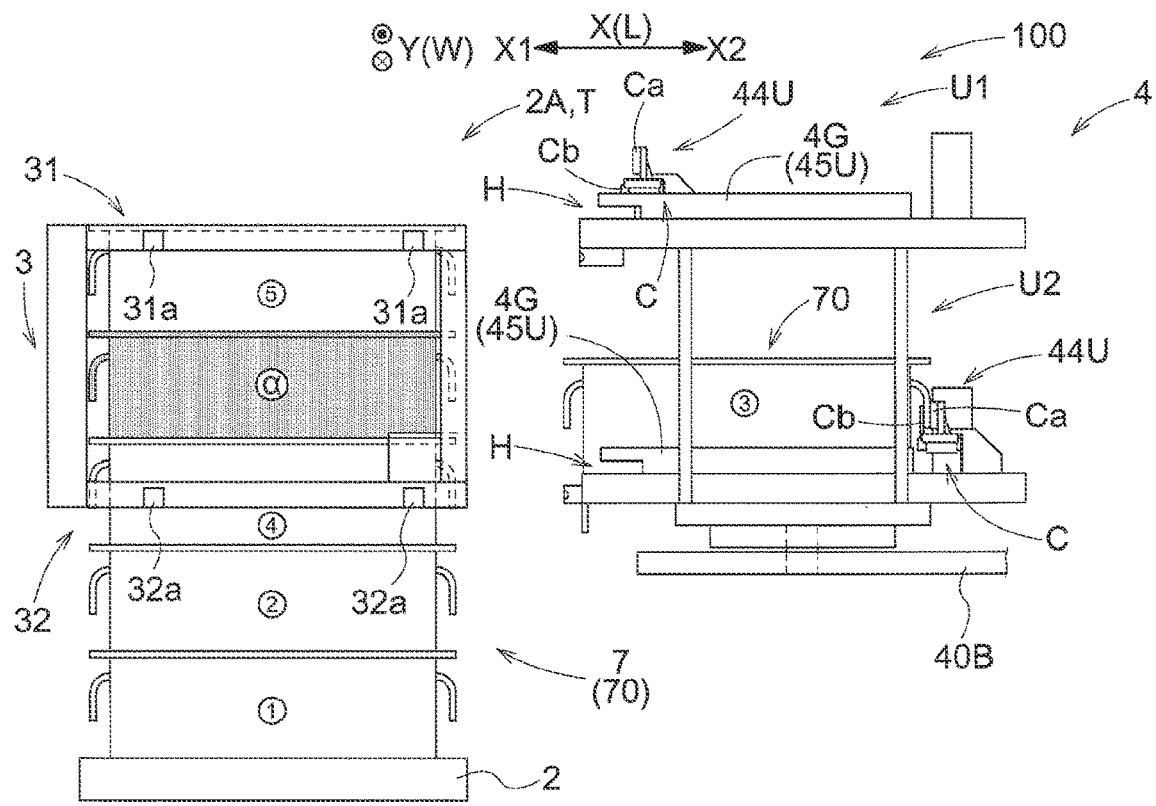
FIG. 13 is an explanatory diagram illustrating a case where a parallel operation for scooping up containers from and unloading containers to a stacking region is performed.

FIGS. 11 to 13 show a transfer operation for transferring the container 70 to the stacking region 2A. As described above, in the present embodiment, it is possible, using the lifting device 3, to form spaces in the vertical direction between the plurality of containers 70 stacked in the stacking region 2A. The transfer device 4 uses these spaces to transfer the container 70 to the stacking region 2A. In the present embodiment, the transfer device 4 is configured to perform a scooping operation and an unloading operation for scooping up and unloading the container 70 from and to the stacking region 2A. Specifically, the transfer device 4 is configured to perform a parallel operation for scooping up the container 70 from and unloading the container 70 to the stacking region 2A in parallel.

FIGS. 11 to 13 show an example in which containers 70 arranged in five rows are stacked as a container group 7 in the stacking region 2A. In the drawings, numerals "1 to 5" are assigned to the stacked containers 70 in order from bottom to top. The character "α" is assigned to the container 70 to be unloaded that is held by the holder H of the first unit U1. In the example described below, using a space formed in the vertical direction between the container 70 (container "5") in the fifth row and the container 70 (container "4") in the fourth row by the lifting device 3, the container 70 to be unloaded (container "α") is unloaded onto the container 70 (container "4") in the fourth row. In parallel with this, the container 70 (container "3") in the third row is scooped up using a space formed below the container 70 (container "4") in the fourth row by the lifting device 3.

As shown in FIG. 12, the controller 6 (see FIG. 3) sets the locking part Cb of the second unit U2 in a locking orientation, and causes the locking part Cb to move toward the transfer-direction scooping side X2 relative to the holder H, with the locking part Cb being locked to the container 70 (container "3"). In parallel with this, the controller 6 causes the pressing part Ca to move toward the transfer-direction unloading side X1 relative to the holder H, with the container 70 (container "α") held by the holder H of the first unit U1 being pressed by the pressing part Ca. Thus, the locking part Cb of the second unit U2 pulls the container 70 to be scooped up (container "3") toward the transfer-direction scooping side X2, and the pressing part Ca of the first unit U1 presses the container 70 to be unloaded (container "α") toward the transfer-direction unloading side X1.

Then, the controller 6 performs control to place, on the holder H of the second unit U2, the container 70 to be scooped up (container "3") pulled by the locking part Cb of the second unit U2, and to place, above the container 70 (container "4") lifted by the second lifting holder 32a, the container 70 to be unloaded (container "α") pressed by the pressing part Ca of the first unit U1, and causes the container "α" to be fitted to the container 70 (container "4"). Consequently, the container group 7 in the stacking region 2A is in a state as shown in FIG. 13. That is, part (container 70 (container "3")) of the plurality of containers 70 disposed in the stacking region 2A is replaced with a new container 70 (container "α").

OTHER EMBODIMENTS

Next, other embodiments of the transfer device will be described.

(1) In the above embodiment, an example is described in which the transfer rotational body 441a is configured as a pulley, and the transfer transmission member 441b is configured as a belt. However, the present disclosure is not limited to such an example, and the transfer rotational body 441a may be configured as a sprocket, and the transfer transmission member 441b may be configured as a chain, for example. Similarly, the guide rotational body 451a may be configured as a sprocket rather than a pulley, and the guide transmission member 451b may be configured as a chain rather than a belt. Also, the present disclosure is not limited to a configuration in which the transfer drive transmission mechanism 441 includes the transfer rotational bodies 441a and the transfer transmission member 441b, and the guide drive transmission mechanism 451 includes the guide rotational bodies 451a and the guide transmission member 451b. For example, the transfer drive transmission mechanism 441 may be configured using a ball screw mechanism, and the transfer drive source 442 may be an electric motor that drives the screw shaft of the ball screw mechanism. Similarly, the guide drive transmission mechanism 451 may be configured using a ball screw mechanism, and the guide drive source 452 may be an electric motor that drives the screw shaft of the ball screw mechanism. In either case, the rotational shaft of the electric motor may extend in the vertical direction or in the horizontal direction, or may extend in a direction that is inclined in these directions.

(2) In the above embodiment, an example is described in which the transfer transmission member 441b is above the guide transmission member 451b. However, the present disclosure is not limited to such an example, and the transfer transmission member 441b may be disposed downward of the guide transmission member 451b.

(3) In the above embodiment, an example is described in which the arrangement region 4R in the vertical direction (drive source arrangement region 4R) of both the transfer drive source 442 and the guide drive source 452 overlaps the arrangement region 70R in the vertical direction (container arrangement region 70R) of the container 70 held by the holder H. However, the present disclosure is not limited to such an example, the drive source arrangement region 4R and the container arrangement region 70R need not overlap each other.

(4) In the above embodiment, an example is described in which the two guide sections 4G turn using the respective fulcrum portions 4Ga as a turning center, thus changing the interval therebetween in the width direction Y. However, the present disclosure is not limited to such an example, and the two guide sections 4G may each be configured to move parallel to the width direction Y while keeping an orientation parallel to the transfer direction X, thus changing the interval therebetween in the width direction Y.

(5) The arrangement positions of the plurality of transfer rotational bodies 441a described in the above embodiment are merely examples, and may be changed as appropriate according to the structure of the transfer device 4. Similarly, the arrangement positions of the plurality of guide rotational bodies 451a may also be changed as appropriate according to the structure of the transfer device 4.

(6) In the above embodiment, an example is described in which the transfer device 4 includes a plurality of (two in the above embodiment) units U each including a body B, a transfer unit 44U, a guide unit 45U, and a holder H. However, the present disclosure is not limited to such an example, and the transfer device 4 may include only one unit U.

(7) In the above embodiment, an example is described in which the transfer device 4 is configured as a part of the transport vehicle 100 that travels on a floor. However, the present disclosure is not limited to such an example, and the transfer device 4 may be configured as a part of another well-known transport device such as a stacker crane, for example.

(8) Note that the configurations disclosed in the embodiments described above are applicable in combination with configurations disclosed in other embodiments as long as no inconsistency arises. With regard to the other configurations as well, the embodiments disclosed herein are illustrative in all respects. Therefore, various modifications and alterations may be made as appropriate without departing from the gist of the present disclosure.

Outline of the Embodiment

An outline of the transfer device described above will be described below.

A transfer device that includes a holder configured to hold an article, and that is configured to perform a transfer operation including (i) an unloading operation for transferring the article from the holder to a transfer target location and (ii) a scooping operation for transferring the article from the transfer target location to the holder, the transfer device including:

a transfer unit configured to move the article in a horizontal transfer direction between the holder and the transfer target location;

a guide unit configured to guide, in the transfer direction, the article that is moved between the holder and the transfer target location; and a body configured to support the transfer unit and the guide unit, wherein the transfer unit includes: a contact section configured to come into contact with the article to move the article in the transfer direction during the transfer operation, and a transfer driver configured to cause the contact section to reciprocate in the transfer direction, the guide unit includes: a pair of guide sections disposed on opposite sides of the article held by the holder in a width direction that is orthogonal to the transfer direction in a vertical view taken in a vertical direction; and a guide driver configured to change an interval between the two guide sections in the width direction, the transfer driver includes a transfer drive transmission mechanism drivingly coupled to the contact section; and a transfer drive source configured to drive the transfer drive transmission mechanism, the guide driver includes a guide drive transmission mechanism drivingly coupled to the guide sections; and a guide drive source configured to drive the guide drive transmission mechanism, the transfer drive source and the guide drive source are disposed on a scooping side in the transfer direction relative to the holder, the scooping side being from the transfer target location toward the holder in the transfer direction, and an unloading side in the transfer direction being from the holder toward the transfer target location in the transfer direction, and the transfer drive transmission mechanism and the guide drive transmission mechanism intersect each other in the vertical view at an intersection portion, and are adjacent to each other in the vertical direction at the intersection portion.

With this configuration, the transfer drive source and the guide drive source are disposed on the scooping side in the transfer direction relative to the holder. Accordingly, the vertical size of the transfer device can be kept small as compared with a case where the transfer drive source and the guide drive source are disposed overlapping with the holder in a vertical view. In addition, as compared with a case where the transfer drive source and the guide drive source are disposed on the unloading side in the transfer direction relative to the holder, the presence of the drive sources is less likely to obstruct the transfer of the article. With this configuration, the movement direction of the contact section and the movement direction of the guide section intersect each other, and the contact section and the guide section are disposed relative to the holder. Therefore, the transfer drive transmission mechanism and the guide drive transmission mechanism inevitably have an intersection portion where they intersect each other in a vertical view. However, the transfer drive transmission mechanism and the guide drive transmission mechanism are disposed adjacent to each other in the vertical direction at the intersection portion. Accordingly, the vertical size of the transfer device can be easily kept small even though the transfer drive transmission mechanism and the guide drive transmission mechanism have an intersection portion. As such, this configuration can reduce the vertical size of the transfer device.

Here, it is preferable that the transfer drive transmission mechanism includes: a plurality of transfer rotational bodies rotatably supported to the body; and an endless transfer transmission member wound around the plurality of transfer rotational bodies, at least one of the plurality of transfer rotational bodies is drivable by the transfer drive source to rotate, the transfer transmission member has a portion with a transfer-direction arrangement region disposed in the transfer direction, the contact section is coupled to the transfer-direction arrangement region, the guide drive transmission mechanism includes: a plurality of guide rotational bodies rotatably supported to the body; and an endless guide transmission member wound around the plurality of guide rotational bodies, at least one of the plurality of guide rotational bodies is drivable by the guide drive source to rotate, the guide transmission member has a portion with a width-direction arrangement region disposed in the width direction, each of the two guide sections is coupled to the width-direction arrangement region, and the intersection portion includes a portion of the transfer-direction arrangement region and a portion of the width-direction arrangement region.

With this configuration, only endless transmission members (the transfer transmission member and the guide transmission member) need to be provided as the respective members of the transfer drive transmission mechanism and the guide drive transmission mechanism that are disposed in the intersection portion. Thus, with this configuration, the vertical size of the intersection portion can be easily reduced, and thus the vertical size of the transfer device can be easily reduced.

It is preferable that the transfer transmission member is above the guide transmission member.

With this configuration, it is possible to secure a large movement range for the contact section that moves along the transfer transmission member, while arranging the transfer transmission member and the guide transmission member in an appropriate positional relationship. This makes it possible to secure a large movement range for the article that is moved in the transfer direction by the contact section. Accordingly, it is also possible to flexibly set the movement range of the article in the transfer direction according to the layout of the facility.

It is preferable that the transfer drive source and the guide drive source are each an electric motor including a rotational shaft, the respective rotational shafts of the transfer drive source and the guide drive source extend in the vertical direction, and the transfer drive source and the guide drive source are arranged in a region in the vertical direction which region overlaps a region in the vertical direction in which the article held by the holder is arranged.

With this configuration, the rotational shafts of the transfer drive source and the guide drive source extend in the vertical direction. Accordingly, the horizontal size of the transfer device can be easily reduced. In addition, in this configuration, the arrangement region in the vertical direction of both the transfer drive source and the guide drive source overlaps the arrangement region in the vertical direction of the article held by the holder. Accordingly, the vertical size of the transfer device can also be reduced easily.

The technique according to the present disclosure is applicable to a transfer device that includes a holder configured to hold an article, and that performs a transfer operation including an unloading operation for transferring the article from the holder to a transfer target location, and a scooping operation for transferring the article from the transfer target location to the holder.

What is claimed is:

1. A transfer device comprising a holder configured to hold an article and is configured to perform a transfer operation including (i) an unloading operation for transferring the article from the holder to a transfer target location and (ii) a scooping operation for transferring the article from the transfer target location to the holder, the transfer device comprising:

a transfer unit configured to move the article in a horizontal transfer direction between the holder and the transfer target location;

a guide unit configured to guide, in the transfer direction, the article that is moved between the holder and the transfer target location; and a body configured to support the transfer unit and the guide unit, wherein:

the transfer unit comprises:

a contact section configured to come into contact with the article to move the article in the transfer direction during the transfer operation; and a transfer driver configured to cause the contact section to reciprocate in the transfer direction, the guide unit comprises:

a pair of guide sections disposed on opposite sides of the article held by the holder in a width direction that is orthogonal to the transfer direction in a vertical view taken in a vertical direction; and a guide driver configured to change an interval between the guide sections in the width direction, the transfer driver comprises:

a transfer drive transmission mechanism drivingly coupled to the contact section; and a transfer drive source configured to drive the transfer drive transmission mechanism, the guide driver comprises:

a guide drive transmission mechanism drivingly coupled to the guide sections; and a guide drive source configured to drive the guide drive transmission mechanism, the transfer direction comprises a scooping side and an unloading side, the scooping side being located in the direction of the holder relative to the transfer target location and the unloading side being located in the direction of the transfer target location relative to the holder, the transfer drive source and the guide drive source are disposed on the scooping side of the holder, the scooping side is from the transfer target location toward the holder in the transfer direction, and an unloading side in the transfer direction is from the holder toward the transfer target location in the transfer direction, wherein:

the transfer drive source and the guide drive source are each an electric motor having a rotational shaft, the respective rotational shafts of the transfer drive source and the guide drive source extend in the vertical direction, each of the transfer drive source and the guide drive source is disposed at a position different from the article held by the holder, and when viewed in a horizontal direction, the transfer drive source and the guide drive source are arranged in a region in the vertical direction which region overlaps a region in the vertical direction in which region the article held by the holder is arranged, and the transfer drive transmission mechanism and the guide drive transmission mechanism intersect each other in the vertical view at an intersection portion, and are adjacent to each other in the vertical direction at the intersection portion.

2. The transfer device according to claim 1, wherein:

the transfer drive transmission mechanism comprises:

a plurality of transfer rotational bodies rotatably supported to the body; and an endless transfer transmission member wound around the plurality of transfer rotational bodies, at least one of the plurality of transfer rotational bodies is drivable by the transfer drive source to rotate, the transfer transmission member has a portion with a transfer-direction arrangement region disposed in the transfer direction, the contact section is coupled to the transfer-direction arrangement region, the guide drive transmission mechanism comprises:
  a plurality of guide rotational bodies rotatably supported to the body; and
  an endless guide transmission member wound around the plurality of guide rotational bodies, at least one of the plurality of guide rotational bodies is drivable by the guide drive source to rotate, the guide transmission member has a portion with a width-direction arrangement region disposed in the width direction, each of the two guide sections is coupled to the width-direction arrangement region, and the intersection portion comprises a portion of the transfer-direction arrangement region and a portion of the width-direction arrangement region.

3. The transfer device according to claim 2, wherein the transfer transmission member is above the guide transmission member.

* * * * *